(12) United States Patent
Hakala et al.

(10) Patent No.: US 10,749,423 B2
(45) Date of Patent: *Aug. 18, 2020

(54) LINEAR FLUX SWITCHING PERMANENT MAGNET MOTOR

(71) Applicant: KONE Corporation, Helsinki (FI)

(72) Inventors: Tero Hakala, Helsinki (FI); Tuukka Korhonen, Helsinki (FI); Tero Purosto, Helsinki (FI); Ilya Petrov, Helsinki (FI); Juha Pyrhönen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 150 days.

This patent is subject to a terminal disclaimer.

(21) Appl. No.: 15/945,535

(22) Filed: Apr. 4, 2018

(65) Prior Publication Data

US 2018/0294705 A1 Oct. 11, 2018

(30) Foreign Application Priority Data

Apr. 5, 2017 (EP) ..................................... 17164952

(51) Int. Cl.
*H02K 41/03* (2006.01)
*B66B 11/04* (2006.01)
(Continued)

(52) U.S. Cl.
CPC ........ *H02K 41/031* (2013.01); *B66B 11/0407* (2013.01); *H02K 41/033* (2013.01);
(Continued)

(58) Field of Classification Search
CPC .... H02K 41/033; H02K 41/031; H02K 41/03; H02K 2213/03; H02K 1/223; B66B 11/0407

USPC .... 310/216.023, 216.024, 216.025, 216.026, 310/216.027, 216.028, 181, 12.01, 12.21, 310/12.22, 12.24, 12.25, 12.26

See application file for complete search history.

(56) References Cited

U.S. PATENT DOCUMENTS 6,305,501 B1 * 10/2001 Kahkipuro .......... B66B 11/0407
  187/250
6,326,706 B1 * 12/2001 Zhang ................... F04B 35/045
  310/12.24

(Continued)

FOREIGN PATENT DOCUMENTS

CN        104242501 A     12/2014

OTHER PUBLICATIONS

European Search Report, issued in Priority Application No. 17164952.8, dated Sep. 20, 2017.

*Primary Examiner* — Quyen P Leung
*Assistant Examiner* — Robert E Mates
(74) *Attorney, Agent, or Firm* — Birch, Stewart, Kolasch & Birch, LLP

(57) ABSTRACT

A linear flux switching permanent magnet (FSPM) motor includes a longitudinal linear stator with stator teeth facing an air gap and a mover including at least one armature including armature teeth, which are spaced apart by slots for receiving an armature winding. At least some, preferably all of the armature teeth embed at least two permanent magnets, respectively, which are positioned successively in longitudinal direction of the tooth, whereby the two permanent magnets have different magnetic properties.

20 Claims, 7 Drawing Sheets

Figure 1:
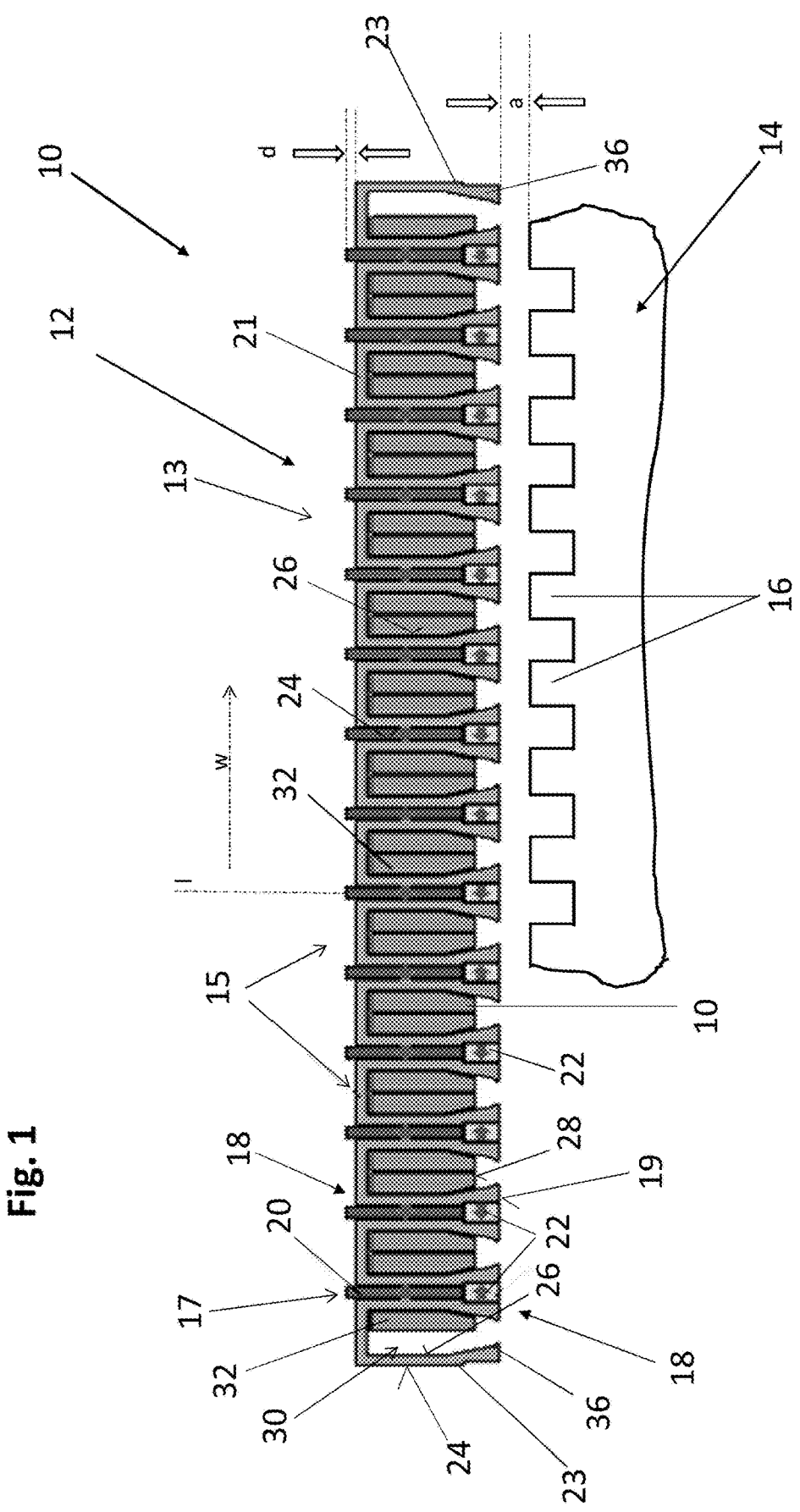

(51) Int. Cl.
*H02K 1/02* (2006.01)
*H02K 1/22* (2006.01)

(52) U.S. Cl.
CPC ............... *H02K 1/02* (2013.01); *H02K 1/223* (2013.01); *H02K 2213/03* (2013.01); *H02K 2213/12* (2013.01)

(56) References Cited

U.S. PATENT DOCUMENTS

| | | | |
|---|---|---|---|
| 6,603,224 B1* | 8/2003 | Hollingsworth | H02K 41/02 310/12.02 |
| 6,833,637 B2* | 12/2004 | Park | H02K 33/16 310/12.01 |
| 2006/0125326 A1* | 6/2006 | Baccini | H02K 41/031 310/12.25 |
| 2009/0152956 A1 | 6/2009 | Yang | |
| 2009/0206682 A1* | 8/2009 | Jajtic | H02K 41/033 310/12.24 |
| 2009/0206686 A1 | 8/2009 | Vollmer | |
| 2011/0169365 A1* | 7/2011 | Calley | H02K 21/125 310/156.02 |
| 2013/0241340 A1* | 9/2013 | Koga | H02K 1/2773 310/156.56 |
| 2013/0249324 A1* | 9/2013 | Gandhi | H02K 41/033 310/12.18 |
| 2014/0333168 A1* | 11/2014 | Bouarroudj | H02K 1/2773 310/156.56 |
| 2015/0001980 A1* | 1/2015 | Zhang | H02K 21/16 310/156.43 |
| 2015/0028707 A1* | 1/2015 | Kim | H02K 1/2773 310/156.01 |
| 2016/0268883 A1 | 9/2016 | Kakihara et al. | |

\* cited by examiner

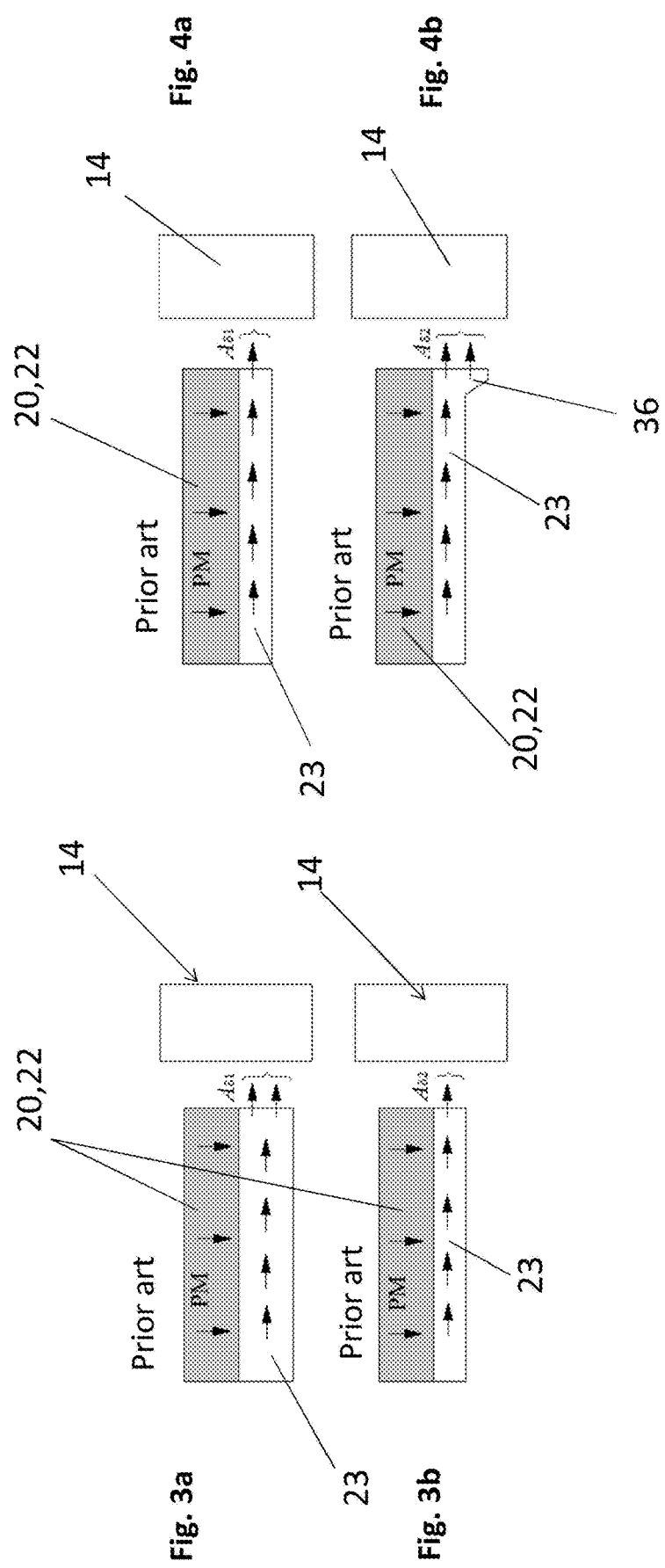

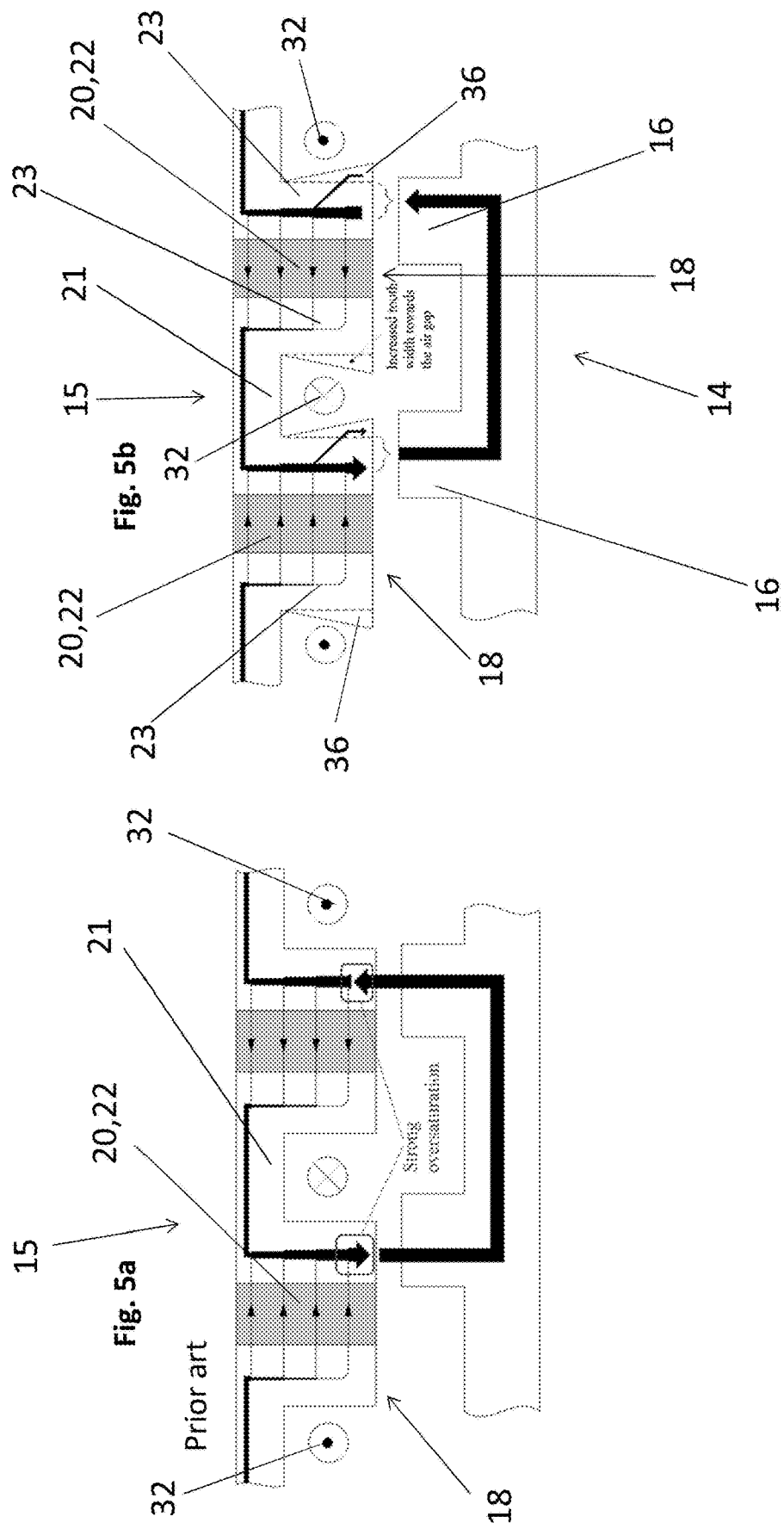

LINEAR FLUX SWITCHING PERMANENT MAGNET MOTOR

The invention relates to a linear flux switching permanent magnet motor comprising a longitudinal linear stator with stator teeth facing an air gap and a mover comprising an armature comprising armature profiles comprising profile members forming together with at least one permanent magnet an armature tooth of the mover, whereby the armature teeth are spaced apart by slots for receiving an armature winding. The teeth have a first side fitting against permanent magnet(s) and a second side facing the slots and fitting against the armature windings whereby the teeth have an extended width towards the air gap. Such a known construction is for example shown in FIG. 2(a) where a semi-closed slot is formed by tooth tips which extend in the uppermost part of the teeth so that the area where the copper or winding is located in the slots is not affected by the tooth tip with the increased width. This embodiment has the advantage that the space for the copper of the armature windings is not affected by the extended tooth tip.

In linear flux switching permanent magnet motors (FSPM), this solution may lead to an over-saturation in the tooth tips which are accompanied by a flux leakage and may even lead to an irreversible de-magnetization of the permanent magnets.

The CN 104 242 501 A discloses a linear flux switching permanent magnet motor.

It is therefore object of the present invention to provide an FSPM motor where the above-mentioned problems are reduced.

The object is solved with a linear FSPM motor. Preferred embodiments of the invention are subject-matter of the dependent claims. Preferred embodiments of the invention are also described in the description as well as in the drawings.

Basically, the linear flux switching permanent magnet (FSPM) motor of the invention comprises a longitudinal linear stator with stator teeth facing an air gap a and a mover comprising at least one armature comprising armature teeth, which are spaced apart by slots for receiving an armature winding. According to the invention at least some, preferably all of the armature teeth embed at least two permanent magnets, respectively, which are positioned successively in longitudinal direction l of the tooth, whereby the two permanent magnets have different magnetic properties.

In the area of the armature tooth tips, the flux density is really high which may lead to over-saturation. Further away from the tooth tip the flux density in the permanent magnets might drop to a relatively low value. This low operational flux density value can cause irreversible demagnetization of the permanent magnets, especially when permanent magnets work in high temperature conditions. Thus, the second permanent magnets with good de-magnetization properties are selected for this tooth area, which area extends preferably over most of the length of the armature tooth. Anyway, magnets with good irreversible de-magnetization properties as for example neodymium magnets have a weaker remanence which means that the performance of the motor drops by selecting stronger magnets in terms of magnetization, which are on the other side weaker in terms of remanence. Thus, the use of two different permanent magnets (hybrid magnets) over the length of the armature tooth solves this problem in that over the uppermost length of the armature tooth a second permanent magnet is used which has good de-magnetization properties but a lower remanence, and only in the area of the tooth tip, a first permanent magnet with a high remanence is used which brings a good efficiency. This kind of permanent magnet hybrid fulfills the need of efficient permanent magnets and on the other side of a good protection against de-magnetization over the uppermost length of the armature tooth.

Preferably, the first permanent magnet has a larger cross-sectional area in a plane parallel to the air gap than the second permanent magnet, which is obtained via a larger width than the second permanent magnet. This reduces the danger of over saturation in the tooth tip. Further, this feature has the effect that the whole group of first and second magnet has an increased efficiency and the flux leakages are reduced.

In a preferred embodiment of the invention, the upper surface of the first permanent magnet is aligned with the tooth tip. This leads to the fact that the first permanent magnet is used in the area where the highest flux density is present. By using a second permanent magnet with low remanence but on the other side with good de-magnetization properties, the operation efficiency and reliability of the SPM motor can be essentially enhanced.

Preferably, the material of the first and second permanent magnet differs from each other as it has been mentioned above so that preferably the second magnet has a lower remanence but better irreversible demagnetization properties than the first permanent magnet which preferably has a higher remanence to increase efficiency. As the flux density in this lower portion of the armature tooth is not as high as in the upper area, particularly the tooth tip, the low remanence together with good de-magnetization properties improves the reliability of the motor.

Preferably, the material of the first and second permanent magnets differ from each other, so that the need of different remanence and de-magnetization properties is already met by selecting a corresponding base material for the permanent magnets.

Figures 2A, 2B, 2C:
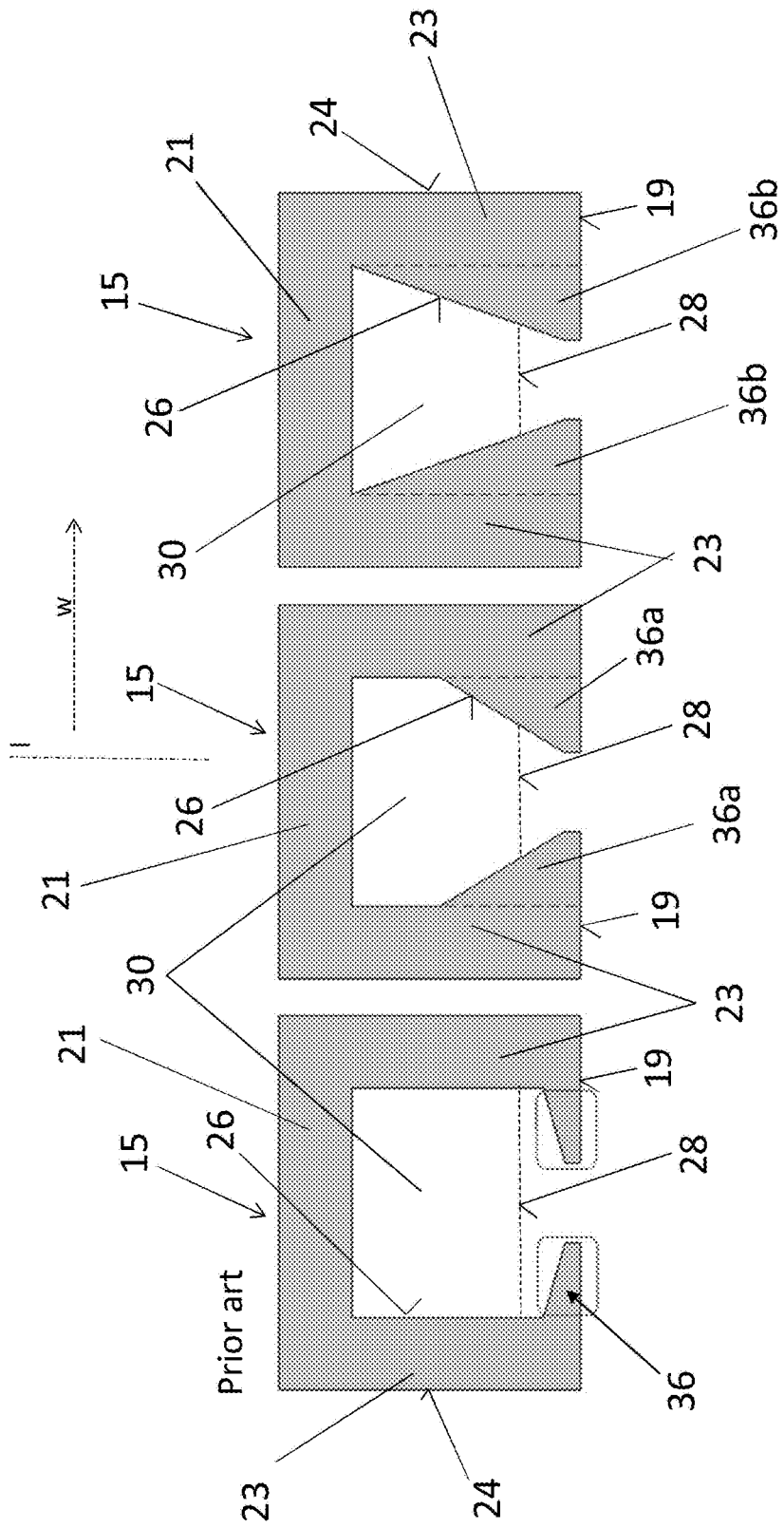

Preferably, the width of the armature teeth increases towards their tip (and towards the air gap), whereby the width increase of the armature teeth begins in the longitudinal direction of the armature teeth already in that the extended width portion of the armature teeth begins in the longitudinal direction l of the armature teeth already at the level of the armature windings, i.e. where the teeth and the adjacent windings face each other. Via this measure, the width increase of the armature teeth takes place over a larger portion of their length. This leads to a reduced flux density at the tooth tips regarding to the known design as it is shown in FIG. 2(a). Although the space for the copper of the armature windings is in the solution of the invention reduced, the flux leakage, the avoiding of excessive flux density and also accordingly the danger of de-magnetization of the permanent magnets is essentially reduced.

Preferably, the width increase of the armature teeth takes place over at least half of their length. Accordingly, the magnetic flux is better distributed and harmonized in this motor geometry.

Preferably, the width of the armature teeth increases continuously without forming an edge in their second sides. This geometry of the armature teeth leads to a homogeneous flux and a reduction of flux leakage.

In a preferred embodiment of the invention, the increase of the width of the armature teeth increases continuously towards the air gap. This feature leads to the fact that the second side is in the direction of the tooth tip or air gap increasingly curved outwards in the direction of the adjacent slot. Thus, the flux leakage at the tooth tip is minimized and no over-saturation in the direction of the air gap takes place in the armature tooth.

Advantageously, the tooth width increase is at least partly realized by a width increase of a width increased portion of the profile members. Thus the extended tooth geometry can easily be designed by the geometry of the width extended portion. Of course also a width increase of the permanent magnet(s) can contribute to the width extension of the tooth towards the tooth tip, particularly if several permanent magnets are used in one tooth or pole.

In a preferred embodiment the armature has at least one armature base extending parallel to the air gap. From the armature base armature members project in the direction of the air gap, i.e. perpendicular to the armature base. The armature base can be one-piece part extending over a larger portion of the mover length, e.g. extending over a third, a half or even the complete mover length. To this armature base a corresponding large number of armature members is connected, preferably as a one-piece part. Alternatively, the armature may also consist of a succession of single U-shaped armature profiles which only have two profile members as armature members which extend perpendicular to the profile base. In any of these cases the armature members form a part of the armature teeth. The tooth width increase of the armature teeth towards the air gap is then preferably formed of the width increased portions of two armature members embedding the permanent magnets as well as from the width increase of the first permanent magnet relative to the second permanent magnet. Particularly if this feature is combined with a higher remanence of the first permanent magnet relative to the second permanent magnet this leads to a reduced tooth saturation and an increased torque.

In a preferred embodiment of the invention the tooth width increase of the armature teeth towards the air gap is formed of the width increased portions of the profile member of two adjacent armature profiles as well as from the width increase of the first permanent magnet relative to the second permanent magnet. This embodiment uses the width increase to improve the flux flow through the teeth by increasing the cross sectional area (width) of the first permanent magnet which his located in the area of the tooth tip.

In a preferred embodiment of the invention, the permanent magnets embedded in the armature teeth protrude the base of the armature profiles at the back side facing away from the air gap. Thus, flux leakage in the area of the profile base is efficiently reduced. Preferably the size this protrusion or overhang is between 2 mm and 6 mm, preferably at between 3 mm and 6 mm.

Preferably the number of mover teeth is per meter length of the mover in its moving direction is between 22 and 42, preferably between 27 and 37. This comparably high number of teeth (poles) per meter length of the mover leads on one hand to a decrease of the torque compared to for example 13 poles per meter because of saturation.

However the higher pole number reduces the cogging torque or torque ripple of the motor. The saturation effect because of the higher number of poles and the decrease of torque is on the other hand met by making armature teeth with the extended width portion according to the base idea of the invention. The above mentioned ranges has proved to best meet the diverging aims of enough saturation and torque ripple decrease.

Preferably, two different permanent magnets are fitted between the first sides of each armature tooth, whereby a second permanent magnet extends over the larger part of the length of the armature tooth, whereas the first permanent magnet is fitted over the first permanent magnet towards the air gap a.

In a preferred embodiment of the invention, the number of the slots is increased. By this way, the flux density in each slot is reduced which again reduces flux leakage and an excessive flux density in the tooth stops and thus reduce also the risk of a de-magnetization of the permanent magnets. By this means the armature profile members and the permanent magnets may have a reduced width. Thus, preferably the width of the armature teeth is smaller than 30% of the gap width. In this application the term "width" refers to the extension in moving direction of the mover (or longitudinal direction of the stator). The term "length" related to the dimension perpendicular to the air gap plane.

The invention also relates to an elevator comprising a linear motor as it has been described above. Hereby, the mover of the FSPM motor is connected along a side of the elevator car and the stator is mounted on a beam extending along the elevator shaft. An elevator with a thus specified motor has on one hand a good efficiency and on the other hand good operation characteristics and high reliability, particularly against de-magnetization of the permanent magnets of the FSPM motor.

Following terms are used as synonyms: Armature profile—lamination stack—stack segment; PM—permanent magnet—magnet; copper—armature windings; motor—machine; protrusion—overhang;

The present invention emphasizes three techniques for improving the magnetic properties of a FSPM motor as discussed below:
1. Tooth width increase towards the air gap
2. Magnet overhang of the permanent magnets at armature base
3. Hybrid permanent magnet implementation of at least two different permanent magnets 1. Tooth Width Increase Towards the Air Gap If the number of slots is increased (e.g. from 13-slot to 25-slot), the permanent magnet thickness and the armature tooth thickness in 25-slot motor is half of that in 13-slot structure (if no further geometry modification is done).

Assumed that the number of the slots is doubled up than the increasing of the number of slots results in the new slots having half of the thickness of the original slots. Thus in a motor with higher number of slots the magnetic circuit has approximately double the reluctance of the original motor with lower number of slots. One of the main contribution of the higher reluctance comes from the narrower air gap area. In FIGS. 3a and 3b it is shown that the air gap area through which the flux is conducting is smaller in case of thin tooth, as apparent from FIG. 3b compared with the flux in a thick tooth, as shown in FIG. 3a. If e.g. the width of the thin tooth is half of the thick tooth width this means that the magnetic reluctance in case of the thin tooth according to FIG. 3b is double of that in a thick tooth according to FIG. 3a because the reluctance is inversely proportional to the conducting area (A) as can be seen in Eq. (1).

$$R_\delta = \frac{\delta}{\mu_0 A_\delta}; \tag{1}$$

where $R_\delta$ is the reluctance of the air gap, $\delta$ is the length of the air gap, $\mu_0$ is permeability of vacuum, and $A_\delta$ is flux conducting area.

The higher reluctance inevitably leads to a smaller flux by a single permanent magnet conducting through the air gap. Therefore, in case of an FSPM motor with high a number of slots and accordingly small tooth thickness it is advantageous to apply teeth with increasing tooth width leading to semi-closed armature slots. The aim is to increase the air gap area through which the magnetic flux is conducting as it is shown in FIG. 4a disclosing a rectangular tooth design and FIG. 4b showing an increased tooth width design.

It is possible to significantly reduce the air gap reluctance by applying semi-closed slots in a FSPM with a thin armature teeth. However, this is a traditional method of increasing the flux traveling through the air gap applied in PMSMs. Nevertheless, this method has a significant shortcoming. The reason of shortcoming is explained in FIG. 5a. In this figure it is shown that a cumulative effect of the flux concentration in the tooth leads to a strong flux oversaturation towards the air gap. Whereas, this oversaturation increases the reluctance of the magnetic circuit (not in the air gap but in the lamination stack) and consequently reduces the PM flux which crosses the air gap.

The semi-closed slots are traditionally implemented by tooth tips, as shown in FIG. 2a. Accordingly the tooth-tips should occupy as small space in the slot as possible to reserve this space for the copper (below the winding level 28). However, applicant found out that in FSPM machines it has revealed beneficial to make the teeth wider towards the air gap than reserving the space for the copper. The wider teeth compensate less copper in the slot and increase the force density of the FSPM machine by boosting the PM flux crossing the air gap. Accordingly, the preferred tooth design for the armature is changed from the prior art design of semi-closed gaps as shown in FIG. 2a to a shape according to FIGS. 2b and 2c wherein the width increase of the teeth extends into the area of the copper (in the area below the copper level 28 of the armature windings. Thus in FIG. 2a the width increase extends over half the length of the armature teeth. In FIG. 2c the width increase even extends over the complete length of the armature teeth, calculated form the copper ground or profile base.

This prevents local areas with strong oversaturation. Therefore, the performance of the FSPM machine is enhanced. The comparison in force produced by motor topology with semi-closed slots (FIG. 2a) and the inventive design (FIG. 2b) is shown in FIG. 6.

Figure 6:
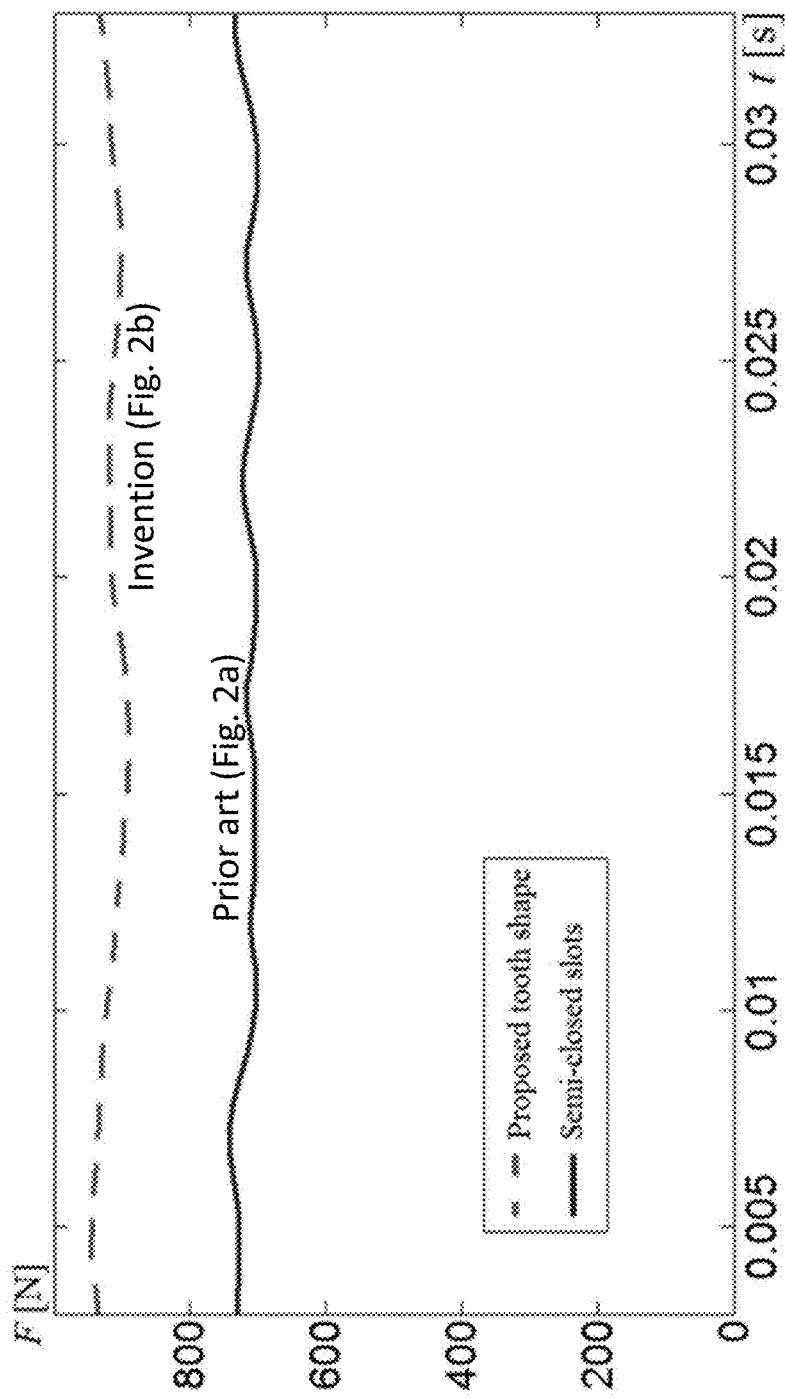

In FIG. 6 the force generated by the FSPMs with semi-closed slots is shown in a continuous line whereas with the proposed inventive tooth shape (with increased width towards the air gap already in the copper area) is shown in a broken line. It can be seen that with the proposed tooth shape it is possible to boost the force produced by the FSPM motor by 30%.

2. Magnet Overhang at the Armature Base

Traditionally in a FSPM machine the magnet has the same height as of the lamination stack segment (or the length of the profile member plus the extension of the profile base in the direction l perpendicular to the air gap). However, if the main magnetic route has a high reluctance, a certain amount of flux leakages might appear. If the amount of flux leakage is moderate it is not critical to the force density generated by a FSPM machine. However, if this flux leakage occupies a certain space in the lamination stack or armature profile, this cloud lead to an increasing oversaturation in certain areas, which again might increase the reluctance of the main magnetic circuit. Thus there might appear a flux leakage at the armature base between two armature profiles. This leakage flows in the same route with the main and useful flux and consequently has a certain impact on the overall magnetic circuit reluctance. In order to reduce the leakage at the armature base the length of the magnet is extended in a way that it protrudes the armature profile on the back side facing away from the air gap.

Figure 7B:
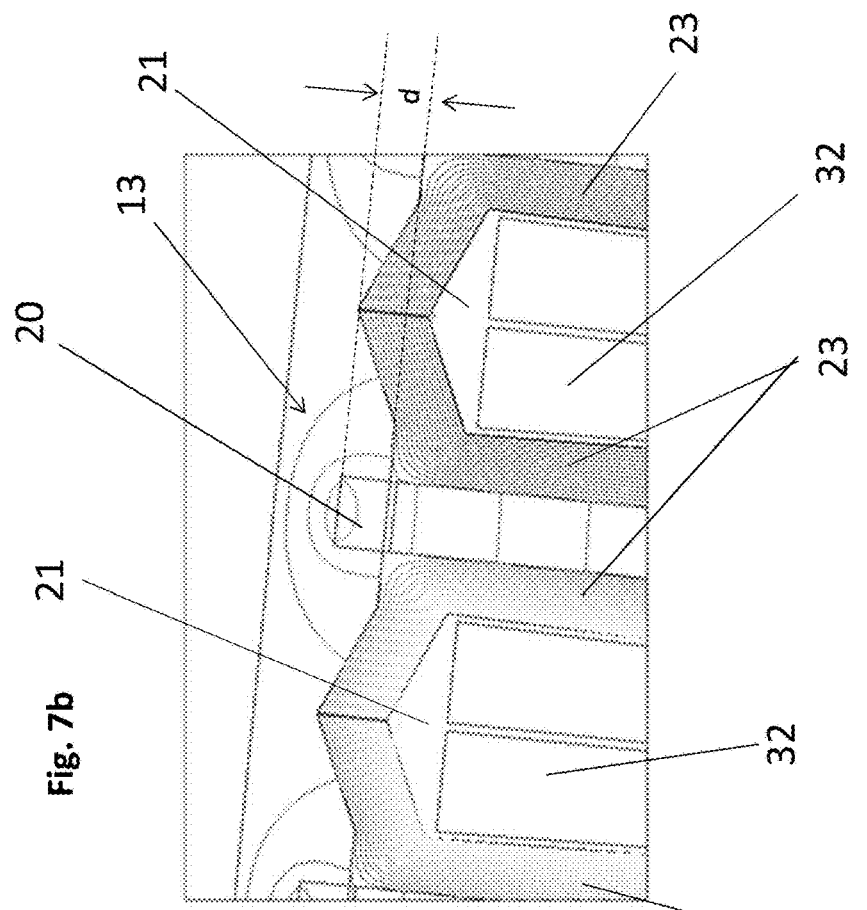
Figure 7A:
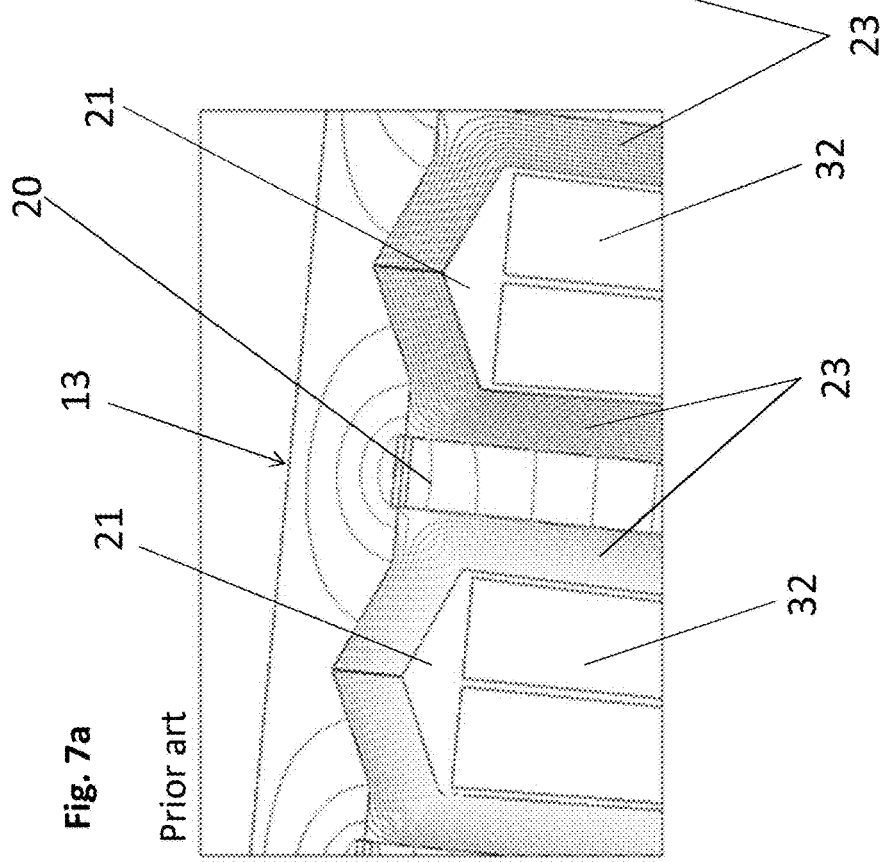

Thus FIG. 7a shows the flux density distribution and leakage path between two armature profiles when the permanent magnets do not protrude the back of the armature profiles. FIG. 7b shows the flux density distribution and flux leakage when the magnet protrudes (overhangs) by about 3.5 mm. In the case of the overhanging permanent magnet the flux density at the top of the lamination tooth is reduced and it is possible to make this area thinner and thus increase the slot space for the copper.

3. Hybrid Permanent Magnet Implementation

The magnetic circuit of the FSPM with relatively thin teeth has large reluctance. Therefore, the flux density in the permanent magnets might drop to relatively low value. This low operational flux density value can cause irreversible demagnetization of the permanent magnet(s), especially when the permanent magnets work in high temperature conditions.

In order to avoid this irreversible demagnetization the material type selected for the permanent magnets should be dedicated for that harsh working conditions. However permanent magnets, e.g. Neodymium magnets, which have good irreversible demagnetization properties have on the other side a weak remanence. This means that the performance of the machine drops by selecting stronger magnets in terms of demagnetization and weaker in terms of remanence. On this behalf preferably a hybrid permanent magnet system is employed, wherein at least two different types of magnets are selected:
  a) First permanent magnets that produce the main working flux.
  b) Second permanent magnets that eliminate flux leakage between the lamination segments and just keep the main flux (created by the first magnet group) in the correct route.

With this division it is possible to optimize the material of these two different permanent magnets according to their functionality. The first permanent magnet group does not work in harsh conditions but can therefore be made of material type with a high remanence (e.g. $B_r$=1.3 T) whereas the second permanent magnet does not need to have a high remanence because its contribution to the main flux is comparably low, but it works in low flux density and it needs to have good irreversible demagnetization properties. Therefore, this group of second permanent magnets can be made of material type with low remanence (e.g. $B_r$=1.1 T) but with good demagnetization properties.

Figure 8:
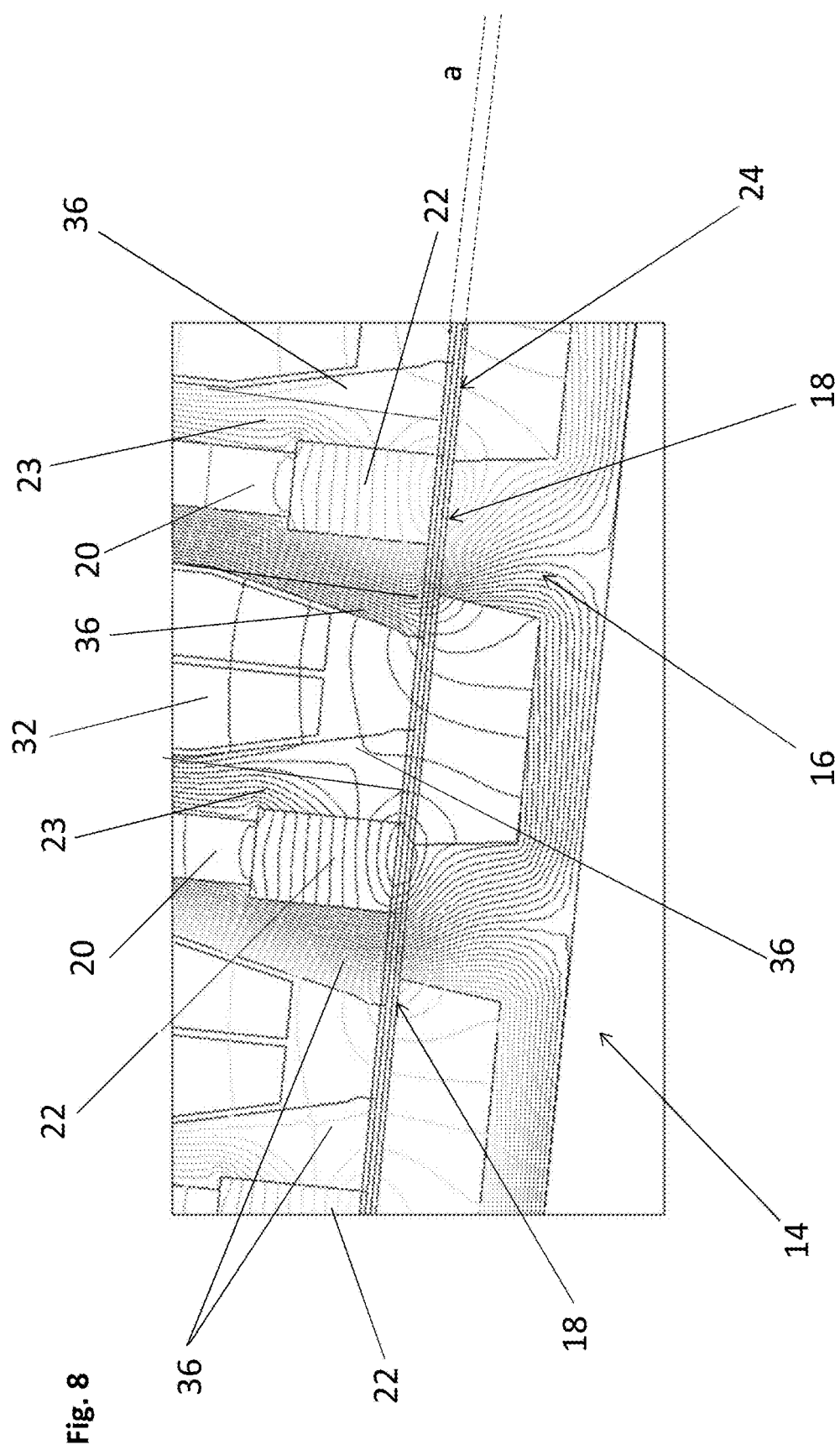

In order to increase the effectiveness of the first magnet group that creates the actual flux and at the same time to optimize the segment shape to reduce flux leakages, it is advantageous to make this first permanent magnet wider (having a larger cross-sectional area) then the second permanent magnet group as it is shown in FIGS. 1 and 8. The advantageous hybrid magnet material including at least two different permanent magnets and preferably different widths gives more freedom in the optimization of the inventive FSPM machine to enhance its performance and avoids irreversible demagnetization.

Preferably, and as it is usual in armature geometry of electric motors the armature is formed from U-shaped armature profiles (stack segments), whereby each permanent magnet of the mover is embedded between the sides of two adjacent armature profiles, and wherein the armature winding is located in between the two parallel members of the U-shaped armature profiles, which parallel members form the armature teeth together with the embedded permanent magnets. This design allows different permanent magnets even of different width to be securely embedded between two parallel members of adjacent armature profiles. Thereby a possible width increase can be designed by the width increase of the armature members of the armature profiles and/or by the width increase of the permanent magnets, preferably that the first permanent magnet in the tooth tip has a higher width than the first one in the lower tooth area, which extends preferably over most of the tooth length.

Preferably, each armature profile is formed by stacked-up armature profile sheet metals, as it is reliable and current practice in armature designs.

Preferably, the at least one permanent magnet is magnetized in a direction perpendicular to the longitudinal direction of the armature teeth. In this case preferably successive permanent magnets in the width direction w of the mover are magnetized in opposite directions.

Preferably, the length of the permanent magnet(s) in length direction I of the tooth is larger than the length of the profile members of the armature profile, particularly than the length of the armature profile in total. Via this feature it is ensured that the permanent magnet projects for the armature backside to improve the flux properties, particularly reducing flux-leakage.

Preferably, the permanent magnets embedded in the armature teeth protrude by an overhang (d) over the armature profiles in a direction facing away from the air gap (a).

This reduces flux leakage at the armature base, whereby the overhang is preferably between 2 and 6 mm, preferably between 3 and 5 mm.

Preferably, in the moving direction of the mover the width of the armature tooth consisting of the permanent magnet(s) embedded between two profile members is in relation to the width of the adjacent armature slot between 40 and 65%, preferably between 50 and 60%, which of course relates to the not width extended tooth portion. This pole geometry leads to very advantageous magnetization properties and a strong and homogenous flux.

Preferably, the maximal width of the width extended portion of the tooth is between 30 and 60%, particularly between 40 and 50% of the width of the profile member in its portion which is not width extended. This leads to an increase of the saturation and to a higher torque, particularly of the number of poles per m length of the mover is increased, i.e. between 20 and 40 per meter length of the mover.

The mover in a passenger elevator has typically a length between 0.5 m and 1.5 m, particularly between 0.7 m and 1 m.

Following terms are used as a synonym: armature member—profile member; armature base—profile base; flux—magnetic flux; armature profile—armature iron; tooth—pole; armature base—armature ground—armature back;

The invention is principally also applicable for a rotary motor, whereby in this case the air gaps is a circle and not linear.

Of course, the invention also covers the use of three or more different magnets per armature tooth. This would enable to optimize the permanent magnet with respect to its distance from the air gap. So in the tip the first permanent magnet may have a high remanence but less good demagnetization properties. Below the first permanent magnet a second one could be used with balanced properties regarding remanence and de-magnetization properties whereas below the second one a third one may be used with lower remanence but good de-magnetization properties.

Some prior art technologies as also the invention is hereinafter described by an embodiment in connection with the enclosed schematic drawings.

FIG. 1 shows a longitudinal cross-section through a mover and a part of a stator of an inventive FSPM motor, and FIG. 2a shows an armature profile design according to the prior art, with a semi-closed slot, FIGS. 2b and 2c show armature profile shapes according to the present invention, FIGS. 3a and 3b the flux when the tooth width is reduced because of increasing the tooth number and decreasing the width of the armature profile member, FIGS. 4a and 4b the flux in case of a known semi-closed slot, FIGS. 5a and 5b the flux in a prior art armature tooth as well as in an armature tooth according to the invention, FIG. 6 the force generated by a conventional mover with semi-closed slots according to FIG. 2(a) and by a mover with increased tooth width according to FIG. 2(b), FIGS. 7a and 7b the leakage flux at the profile base with a conventional design (FIG. 7a) as well as with a permanent magnet overhang according to the invention (FIG. 7b), FIG. 8 the flux in an inventive mover armature with increased tooth width as well as width a permanent magnet hybrid consisting of two different permanent magnets.

FIG. 1 shows a linear FSMP motor 10 comprising a mover 12 and a stator 14 which is only shown in a part as the stator normally extends over a length of several meters to tenth of meters or even to hundreds of meters in high-rise elevators in an elevator shaft. The mover 12 is usually connected alongside of a side of an elevator car and the co-action between a stator 14 and mover 12 is used to move the elevator car vertically along the elevator shaft. Between the stator 14 and the mover 12, an air gap a is provided whereby on the stator side, stator teeth 16 face to the air gap a, whereas on the side of the mover 12, an armature 13 with is provided consisting of several preferably U-shaped armature profiles 15 positioned successively and adjacent to each other in width direction w of the armature 13, only spaced apart by permanent magnets 20, 22 positioned in-between. I denominates the length direction of the armature 13 in the direction of the air gap (perpendicular to the air gap plane) a to define the areas of the armature with respect to their distance from the air gap a. These direction nominations hold true for all figures.

Each armature profile 15 consists of an profile base 21 having two parallel profile members 23 extending perpendicular to the profile base 21. The profile members 23 of two adjacent armature profiles 15 form an armature tooth embedding at least two different permanent magnets 20, 22 embedded in between. The first permanent magnet 22 is in the tooth tip area, has a larger width than the second permanent magnet 20 and a higher remanence but less good de-magnetization properties. The second permanent magnet extend over most of the length of the armature tooth 18 and protrudes on the armature back or armature base by an overhang d. The second permanent magnet has a lower remanence than the first permanent magnets but better de-magnetization properties. The armature teeth 18 protrude from the armature 13 in the direction of the air gap a. Between the profile members 23 of each armature profile 15 a slot for 30 is formed which is adapted to accommodate an armature winding 32.

The armature profiles 15 are regularly laminated stacks or stack segments, build up form correspondingly profiled sheet metals. An armature profile 15 may also consist of several of these U-profiles in succession as a one-piece part, reducing the number of separate armature profiles 15 for the armature 13.

The profile members 23 of two adjacent armature profiles embed a second permanent magnet 20 over most of the length l of the armature tooth 18. A first permanent magnet 22 is located on the top of the second permanent magnet 20 particularly in the area of the tooth tip 19. The first permanent magnet 22 has a larger base area and width than the second permanent magnet 20 and is aligned with its upper surface with the tip 19 of the armature tooth 18 facing the air gap a.

The second permanent magnets 20 protrude above the back of the armature 13 formed by the profile base 21 of the armature profiles 15 by an overhang d, which reduces flux leakage in the area of the profile base 21.

A linear FSPM motor with these properties has a high efficiency and a low flux leakage and a high reliability against de-magnetization.

The FIGS. 2(b) and 2(c) show two different possible geometries of the armature irons or armature profiles 15 for the mover whereby in the embodiment of FIG. 2(b) the increasing width portion 36 of the profile member 23 extends over half of its length, whereas in the embodiment of FIG. 2(c), the width increasing portion 36 of the armature tooth 18 extends over the complete length l of the profile member 23.

FIGS. 3a and 3b show generally the effect of the reduction of the width of the profile members 23 on the flux between armature 13 and stator 14.

FIGS. 4a and 4b show generally the flux-increasing effect of the well-known semi-closed slot solution 36 of the profile members 23 on the flux between armature 13 and stator 14.

FIGS. 5a and 5b show the advantage of reduced flux-density between armature 13 and stator 14 when using width increased teeth 18 according to the present invention, wherein the width increased portion 36 of the profile members lead to a reduced flux density (black arrow) between armature teeth 18 and stator teeth 16.

With respect to FIGS. 6 and 7 it is referred to the general description above.

FIG. 8 shows the magnetic flux of an inventive linear FSPM motor, having width extended armature teeth 18 on one side and hybrid permanent magnets consisting of second permanent magnets 20, preferably of lower remanence (and corresponding higher de-magnetization stability) over the uppermost part of the length of the teeth 18 which are overlapped in the direction of the tooth tip 19 by first permanent magnets 22 having a larger width than the second permanent magnets 20. These first permanent magnets 22 have also a higher remanence than the second permanent magnets 20 to improve the efficiency of the motor.

In summary, the width increase of the armature teeth 18 is realised by the width increasing portions 36 of the profile members 23 as well as by the increased width of the first permanent magnets 22 with respect to the second permanent magnets 20. It can be seen that the flux density in the interface between armature teeth 18 and stator teeth 16 is moderate, which leads to less leakage flux and to a reduced tendency of irreversible de-magnetization of the permanent magnets 20, 22.

In the embodiment of the drawings the width increase of the armature teeth is optional. The armature teeth can also be straight or can be semi-closed with the width increased portion above the copper (or windings). Also the overhang d of the permanent magnets over the armature ground is optional.

The invention is not restricted to the disclosed embodiments but may be varied within the scope of the appended patent claims.

LIST OF REFERENCE NUMBERS 10 linear FSPM motor
12 mover
13 armature
14 stator
15 armature profile
16 stator tooth
18 armature tooth
20 second permanent magnet
21 armature base—armature profile base
22 first permanent magnet
23 armature member—profile member
24 first side of the profile member facing the permanent magnet(s)
26 second side of the profile member facing the slot
28 level of the armature winding in the slot
30 slot
32 armature winding—copper
36 width extended parts of the profile members
l length direction perpendicular to the mover area
d overhang of the second permanent magnet on the armature ground
w width direction of the armature in length or moving direction of the mover
a air gap

The invention claimed is:

1. A linear flux switching permanent magnet (FSPM) motor comprising:
   a longitudinal linear stator with stator teeth facing an air gap, the stator teeth spaced from one another in a first direction and each stator tooth extending in a second direction; and
   a mover comprising at least one armature comprising armature teeth, which are spaced apart in the first direction by slots for receiving an armature winding,
   wherein at least some of the armature teeth embed at least two permanent magnets, respectively, which are positioned successively in the second direction of each of the armature teeth, whereby the two permanent magnets have different magnetic properties,
   wherein a first permanent magnet is located in the area towards a tooth tip and a second permanent magnet is located below the first permanent magnet in the second direction,
   wherein the first permanent magnet has a higher remanence than the second permanent magnet.

2. The motor according to claim 1, wherein the first permanent magnet has a larger width in the first direction than the second permanent magnet.

3. The motor according to claim 1, wherein an upper surface of each of the first permanent magnets is aligned with a respective tooth tip.

4. The motor according to claim 1, wherein materials of the first and second permanent magnets differ from each other.

5. The motor according to claim 1, wherein the armature is formed from U-shaped armature profiles, comprising a profile base and at least two parallel profile members which extend perpendicular to the profile base and towards the air gap, wherein the permanent magnets are embedded between first sides of the profile members, and wherein the armature winding is located in between second sides of the profile members.

6. The motor according to claim 5, wherein each armature profile is formed by stacked-up armature profile sheet metals.

7. The motor according to claim 5, wherein a length of the permanent magnets in the second direction of the respective tooth is larger than a length of the profile members of the armature profile.

8. The motor according to claim 5, wherein the permanent magnets embedded in the armature teeth protrude by an overhang over the armature profiles in the second direction facing away from the air gap.

9. The motor according to claim 1, wherein the armature has at least one armature base from which armature members project in the second direction, the armature members forming a part of the armature teeth, and wherein an increase in a width of the armature teeth towards the air gap is formed by an increase in a width of the armature members embedding the permanent magnets and an increase in a width of the first permanent magnet.

10. The motor according to claim 1, wherein the armature teeth have an increased width in the first direction towards the air gap, whereby the width of the armature teeth begins in the first direction of the armature teeth at a level of the armature windings.

11. The motor according to claim 10, wherein the width increase of the armature teeth takes place over at least half of a length of the armature teeth length in the second direction.

12. The motor according to claim 10, wherein the increased width portion of the armature teeth increases continuously without forming an edge in a side of the armature teeth facing the slots.

13. The motor according to claim 10, wherein the increase of the width of the increased width portion increases continuously towards the air gap, so that a side of the armature teeth facing the slots is increasingly curved outwards towards the slot.

14. The motor according to claim 1, wherein the number of mover teeth is between 22 and 42 per meter length of the mover in the first direction.

15. An elevator comprising the linear FSPM motor according to claim 1, wherein the mover is connected along a side of an elevator car and the stator is mounted on a beam extending along an elevator shaft.

16. The motor according to claim 1, wherein the number of mover teeth is between 27 and 37 per meter length of the mover in the first direction.

17. The motor according to claim 2, wherein an upper surface of the first permanent magnet is aligned with the tooth tip.

18. The motor according to claim 2, wherein materials of the first and second permanent magnets differ from each other.

19. The motor according to claim 2, wherein the armature is formed from U-shaped armature profiles, comprising a profile base and at least two parallel profile members which extend perpendicular to the profile base and towards the air gap, wherein the permanent magnets are embedded between first sides of the profile, members, and wherein the armature winding is located in between second sides of the profile members.

20. A linear flux switching permanent magnet (FSPM) motor comprising:

a longitudinal linear stator with stator teeth facing an air gap, the stator teeth spaced from one another in a first direction and each stator tooth extending in a second direction; and a mover comprising at least one armature comprising armature teeth, which are spaced apart in the first direction by slots for receiving an armature winding, wherein at least some of the armature teeth embed at least two permanent magnets, respectively, which are positioned successively in the second direction of each of the armature teeth, whereby the two permanent magnets have different magnetic properties, wherein a first permanent magnet is located in the area towards a tooth tip and a second permanent magnet is located below the first permanent magnet in the second direction, wherein the armature teeth have an increased width in the first direction towards the air gap, whereby the width of the armature teeth begins in the first direction of the armature teeth at a level of the armature windings, and wherein the width increase of the armature teeth takes place over at least half of a length of the armature teeth length in the second direction.

* * * * *